United States Patent [19]

Jahnke

[11] Patent Number: 4,611,752

[45] Date of Patent: Sep. 16, 1986

[54] METHOD FOR BONDING METALLIC STRUCTURAL ELEMENTS

[75] Inventor: Bernd Jahnke, Neckargemuend, Fed. Rep. of Germany

[73] Assignee: BBC Aktiengesellschaft Brown, Boveri & Cie., Baden, Switzerland

[21] Appl. No.: 604,749

[22] Filed: Apr. 27, 1984

[30] Foreign Application Priority Data

Apr. 27, 1983 [EP] European Pat. Off. ........ 83104102.5

[51] Int. Cl.⁴ ............................................. B23K 20/00
[52] U.S. Cl. ................................ 228/194; 228/263.13; 228/234; 228/237
[58] Field of Search ................................ 228/193–195, 228/263.13, 234, 237

[56] References Cited

U.S. PATENT DOCUMENTS 3,530,568  9/1970  Owczarski et al. ................. 228/194
4,096,615  6/1978  Cross ............................... 228/193 X

FOREIGN PATENT DOCUMENTS 2106016  4/1983  United Kingdom ................ 228/194

Primary Examiner—Nicholas P. Godici
Assistant Examiner—Karen Skillman
Attorney, Agent, or Firm—Herbert L. Lerner; Laurence A. Greenberg

[57] ABSTRACT

Method for bonding metallic structural elements to form a component, in particular for stationary gas turbines, wherein at least one intermediate layer with a defined thickness is located between the structural elements and is heated together with the structural elements to a temperature which can be specified in advance, and pressure of a magnitude which can be specified in advance is exerted on the structural elements before or after this heating. The temperature and the pressure are maintained sufficiently long that isothermal solidification of the intermediate layer and/or of the alloying material of the structural elements is attained in the joint zone.

19 Claims, 3 Drawing Figures

METHOD FOR BONDING METALLIC STRUCTURAL ELEMENTS

BACKGROUND OF THE INVENTION

1. Field of the Invention

The invention relates to a method for bonding metallic structural elements to form a component, in particular a component for gas turbines. Such components are used for example, as rotor blades or guide vanes and as heat exchanger elements of gas turbines.

2. Description of the Prior Art

In the manufacture of these components, two or more metallic structural elements are preferably permanently bonded together. The bonding of the metallic structural elements was previously carried out by high temperature brazing or by means of diffusion brazing. In high temperature brazing, a nickel or cobalt based braze is used. As is known from W. A. Owczarski in "Process and Metallurgical Factors in Jointing Superalloys and Other High Temperature Materials," Agard LS-91 (1977) 3-1/3-32, diffusion brazing occurs with the formation of a short-term liquid intermediate layer, which latter results from a layer placed in the form of powder or an amorphous foil between the two structural elements to be bonded. A disadvantage of this method is that structural elements with a complex geometrical shape, in particular, cannot be adequately bonded to one another. In addition, pores often appear during high temperature brazing and during diffusion brazing, which pores may be attributed to alterations in density during the solidification process and have an adverse effect on the mechanical properties of the component.

Diffusion welding offers a further possibility of bonding metallic structural elements to form a component. In this case, the two structural elements to be bonded together are welded, under pressure and increased temperatures, by means of pure solid body diffusion. Disadvantages of diffusion welding appear particularly in the bonding of curved surfaces because in this case, very high tolerance requirements are set for the surfaces to be bonded in order to guarantee complete contact. The pressure to be exerted often exceeds 50 MPa and therefore, causes difficulties in the bonding of thin-walled structural elements. In addition, diffusion welding requires a very high temperature so that it demands a very large expenditure of energy.

SUMMARY OF THE INVENTION

An object of the invention is to provide a method for manufacturing components, particularly for gas turbines, in a simple manner by the bonding of two or more metallic structural elements of any given shape, at pressures and temperatures lower than those used in known methods.

With the foregoing and other objects in view there is provided in accordance with the invention a method for bonding metallic structural elements to form a component, in particular for stationary gas turbines, which comprises disposing at least one intermediate layer between the structural elements to be bonded, heating the intermediate layer together with the structural elements to a temperature above the melting temperature of the intermediate layer to melt the intermediate layer, exerting a pressure on the structural elements having the intermediate layer therebetween before or after said heating, and maintaining the temperature and the pressure for a sufficient length of time to effect isothermal solidification of the intermediate layer with the formation of a strong bond substantially free of pores between the structural elements.

In accordance with a further feature of the invention, there is provided a method for bonding metallic structural elements to form a component, in particular for stationary gas turbines, which comprises disposing at least one intermediate layer with a thickness of between 1 and 50 microns between the structural elements, brazing for a short period by heating the intermediate layer together with the structural elements until the brazing seam seal is sealed but the intermediate layer has not completely solidified isothermally, subsequently cooling the structural elements and the intermediate layer, and then subjecting the joint region of the component to isostatic post-pressing at a temperature between 1120° and 1160° C.

Other features which are considered as characteristic for the invention are set forth in the appended claims.

Although the invention is illustrated and described herein as embodied in a method for bonding metallic structural elements, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 3 shows a gas turbine component formed from two metallic structural elements as illustrated in FIG. 2 placed between a lower half 6 and an upper half 7 of pressing tools with the upper surface of the lower half of the pressing tool 6 curved to complement the surface of the structural element 1B with which it comes into contact and similarly, the lower surface of the upper structural element 7 complements the upper surface of structural element 1A. Pressure is applied to the structural element by structural element 7 pressing downwardly against the component 1.

DETAILED DESCRIPTION OF THE INVENTION

Figure 1:
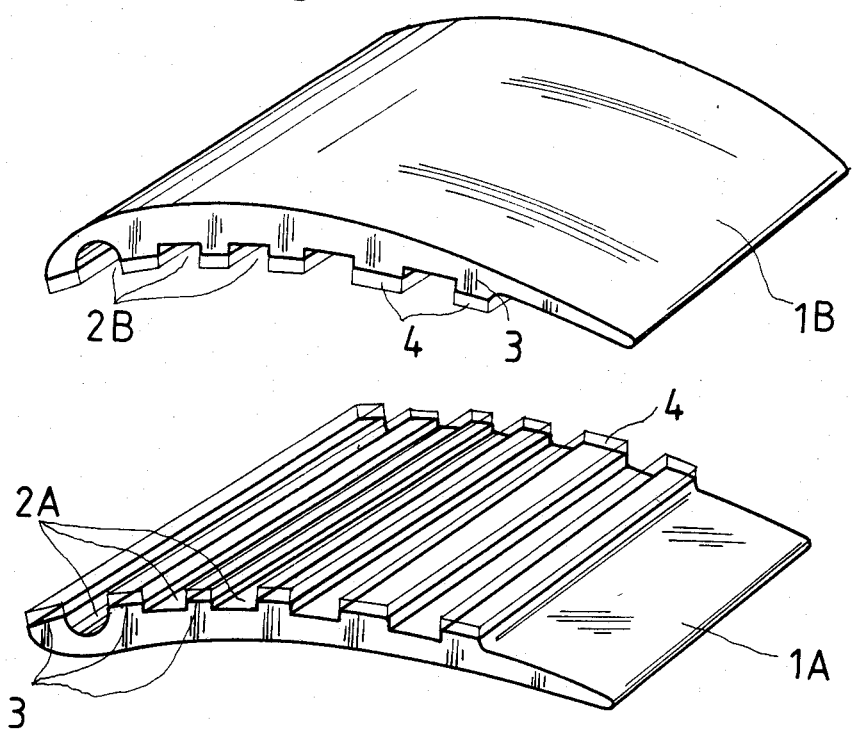
FIG. 1 shows two metallic structural elements which are to be bonded to one another.

The invention relates to a method for bonding metallic structural elements to form a component in particular for gas turbines. Structural elements in a cobalt base or nickel base alloy of type $\gamma$-$\gamma'$ are used for carrying out the method. Alloys of the $\gamma$-$\gamma'$ type are disclosed in Owczarski et al U.S. Pat. No. 4,640,568. In the preparation of a nickel-based alloy of the $\gamma$-$\gamma'$ type, a powder of nickel, cobalt, chromium, titanium, aluminum and some other metals which are not so important are heated to their melting points to become liquid. The temperature is decreased to room temperature. The result is a solid body. The particles of the metals are not homogeneously distributed in the solid body, but in two phases, one of them is called $\gamma$ and the other is called $\gamma'$. The phase $\gamma'$ contains nickel, aluminum, titanium and some other metals, while the phase $\gamma$ contains nickel too, cobalt, chromium and also some other metals used in the alloy.

The surfaces of the structural elements which are to be bonded together, are first coated with an intermediate layer. The intermediate layer can be formed by an amorphous brazing foil, a brazing layer or a brazing powder. The two structural elements are subsequently placed together and are bonded together under the action of temperature and pressure.

By means of the method in accordance with the invention, components can also be manufactured by the bonding of thin-walled structural elements, which can, in addition, have a complex geometrical shape. Structural elements manufactured from an alloy based on nickel or cobalt are preferably used for the manufacture of such components. The bonding of the structural elements occurs under vacuum. In accordance with the invention, an intermediate layer is located between the structural element surfaces to be bonded to one another, which intermediate layer is formed by a brazing foil, a brazing layer, a brazing powder or a powder which reduces the melting point of the alloy forming the structural elements. The thickness of the applied intermediate layer is between 1 and 50 microns. An intermediate layer with a thickness between 10 and 40 microns is preferably applied. The structural elements and the intermediate layer or the intermediate layer alone are subsequently heated to a temperature above the melting temperature of the intermediate layer. The structural elements and the intermediate layer are preferably heated to a temperature between 1120° and 1230° C. A temperature range which is particularly suitable for this purpose lies between 1140° and 1200° C. The intermediate layer is so chosen that its melting point lies in this range or somewhat underneath it. Only such intermediate layer are used as have a lower melting point than the structural elements. Before the heating of the structural elements and the intermediate layer or immediately afterwards, the structural elements are subjected to a pressure between 1 and 100MPa, preferably a pressure between 20 and 30 MPa. The heating of the structural elements and the intermediate layer to a temperature which lies above the melting point of the intermediate layer has the effect that the latter melts and completely fills the joint region between the structural elements to be bonded, in particular the region between the structural element surfaces to be bonded together. Because of the increased pressure, all the tolerances are optimally evened out. The bonding temperature is maintained for a period, which can be specified in advance, of 2 to 6 hours in order to attain the desired metallurgical reaction between the brazing material and the structural elements. Isothermal solidification of the brazing material and of the alloy forming the structural elements is attained in that incipient dissolving of the material forming the structural elements is attained by the effect of the temperature and the pressure. The pressure employed prevents an undesirable formation of pores and favorably influences the precipitation formation. By this means, the formation of a fairly large number of brittle phases is prevented. By the use of a heat treatment period of from 2 to 6 hours, a completely homogeneous non-porous joint zone can be obtained by this means. Using the method in accordance with the invention, a bond is produced between the structural elements, in which bond values for the tensile strength, the yield point, the extension and the creep strength are attained in the region of the joint zone corresponding to those of the base material of the structural elements.

The method in accordance with the invention is particularly suitable for the bonding of structural elements in a nickel base alloy of the $\gamma$-$\gamma'$ type. Structural elements which are manufactured from an alloy having 5 to 24% chromium, 0 to 11% molybdenum, 0 to 2% niobium, 0 to 7% tantalum or niobium, 0 to 22% cobalt, 0 to 6% titanium, 0 to 7% aluminium, 0.1 to 0.5% carbon, 0.001 to 0.2% beryllium, 0 to 0.3% zirconium, 0 to 2% hafnium, 0 to 6% iron and 0 to 12% tungsten based on the total weight of the alloy, can be particularly well bonded using the method in accordance with the invention. A particularly good bond between the structural elements is attained in that the pressure employed is continuously reduced from its maximum value, as the starting point, to its minimum value. A very good result can, however, also be attained if the minimum value of the pressure is used at the beginning and the pressure is then increased to its maximum value.

In accordance with the invention, a component for a gas turbine can also be manufactured in that at least one intermediate layer, in the form of an amorphous brazing foil, a brazing layer or a brazing powder or a powder which reduces the melting point of the material forming the structural elements is applied to the surfaces of the structural elements to be bonded together. A short-term brazing process is subsequently commenced which, however, is only continued to the point where the intermediate layer has not completely solidified isothermally, the brazed seam being, however, sealed. The components so bonded to one another are subsequently cooled. An isostatic post-compression process follows, for which the structural elements are again heated. The process preferably begins with a temperature of 1120° to 1160° C. The structural elements are then heated to between approximately 1180° and 1220° C. The post-compression process is continued for between 2 and 4 hours. This has the advantage that no complex pressing tools have to be used for this purpose, as is the case when using the method described above.

The method in accordance with the invention is described below with reference to the drawings.

The metallic structural elements 1A and 1B shown in FIG. 1 correspond exactly to the two halves of a gas turbine component 1 which has to be formed. The two structural elements 1A and 1B are provided with recesses 2A and 2B, respectively, which run at right angles to their longitudinal axes. The two structural elements 1A and 1B are formed, in terms of their recesses 2A and 2B, symmetrically about a plane. In the component manufactured later by the bonding of the two structural elements, the recesses 2A and 2B, which are located to coincide with one another, form cooling ducts 2 as may be seen from FIG. 2. As may be seen from FIG. 1, an intermediate layer 4 is disposed on the surfaces 3 of the two structural elements 1A and 1B which have to be bonded together. The intermediate layer can, in accordance with the invention, consist of an amorphous brazing foil, a brazing layer or a brazing powder. In the embodiment example shown here, the intermediate layers 4 are formed by a brazing foil. The intermediate layer can also be formed by powder which reduces the melting point of the material forming the structural elements 1A and 1B. A nickel-chromium-boron brazing foil is preferably used for the formation of the intermediate layers 4. The brazing foil used is so chosen that its melting point lies below the melting point exhibited by the material forming the structural elements 1A and 1B. A brazing material, whose melting point lies between 1050° and 1230° C., preferably in a temperature range between 1120° and 1180° C., is preferably chosen for the formation of the intermediate layer. The thickness of the applied intermediate layer 4 is chosen between 1 and 50 microns. The thickness of the intermediate layer 4 used here is 30 microns.

After the application of the intermediate layer 4, the two structural elements 1A and 1B are placed together so that they coincide. They are subsequently heated in a furnace to a temperature of between 1120° and 1180° C. Before or after the heating of the structural elements and the intermediate layers located in the joint zone, the structural elements are subjected to the effect of a pressure of between 1 to 10 MPa. The bonding of the two structural elements occurs in vacuum, the pressure being less than $10^{-3}$ MPa. The effect of the temperature and the pressure on the structural elements is preferably maintained for between 2 to 6 hours. During this period, the formation of an isothermal solidification of the brazing material forming the intermediate layer and of the material forming the structural elements occurs. The structural elements 1A and 1B to be bonded together in the embodiment example shown consist preferably of an alloy which contains 5 to 24% chromium, 0 to 11% molybdenum, 0 to 2% niobium, 0 to 7% tantalum and niobium, 0 to 22% cobalt, 0 to 6% titanium, 0 to 7% aluminium, 0.01 to 0.5% carbon, 0.001 to 0.2% beryllium, 0 to 0.3% zirconium, 0 to 2% hafnium, 0 to 6% iron and 0 to 12% tungsten, based on the total weight of the alloy. The alloy concerned is a nickel base alloy of the type γ-γ'.

After the termination of the heat treatment period, in particular after 2 to 6 hours, a gas turbine component 1 has been manufactured from the two structural elements 1A and 1B under the influence of pressure and temperature.

If the structural elements 1A and 1B, from which the gas turbine component is to be manufactured, exhibit complex geometrical shapes, the manufacturing method can be somewhat varied. For this purpose, a brazing foil, a brazing layer or a brazing powder is first applied to the surfaces of the two structural elements 1A and 1B which have to be bonded. In this process, powder may be applied to the surfaces 3, which have to be bonded, which powder reduces the melting point of the material forming the structural elements 1A and 1B. Also, when carrying out this method, use is preferably made of structural elements 1A and 1B which are manufactured from an alloy exhibiting the composition mentioned above. The structural elements 1A and 1B are placed together and brazed for a short period—for a period which is, in fact, just sufficiently long that the intermediate layer 4 has not completely solidified isothermally but the brazed seam is sealed. The component 1, in particular the joint zone and the two structural elements 1A and 1B, are subsequently cooled. This cooling procedure is followed by an isostatic post-pressing process, the component 1 being heated for this purpose. The heating begins at a temperature of between 1120° and 1160° C. and is then increased to between 1180° and 1220° C. The isostatic post-pressing process is continued for a period of 2 to 4 hours. This method has the advantage that no complex pressing tools are required, such as are advisable in the method described above for the manufacture of the component 1. By this means, where the two structural elements 1A and 1B exhibit complex geometrical shapes, the manufacture of the component 1 is then particularly simplified.

Figure 2:
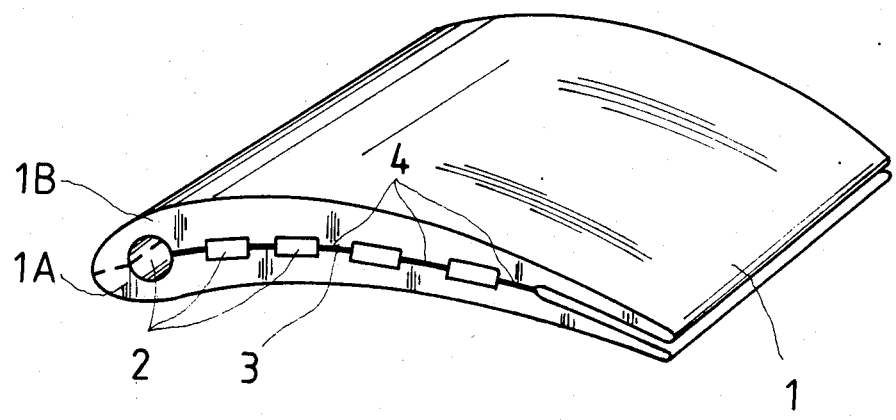
FIG. 2 shows a gas turbine component formed from two metallic structural elements.

The invention is not limited to the embodiment example shown in FIGS. 1 and 2, the invention including, in particular, all the methods in which components are produced by the bonding of metallic structural elements by means of an intermediate layer consisting of a braze being first applied to the surfaces to be bonded and the structural elements subsequently subjected to the effects of a defined temperature and a defined pressure.

The foregoing is a description corresponding, in substance, to European application No. P 83 10 4102.5, dated Apr. 27, 1983, international priority of which is being claimed for the instant application, and which is hereby made part of this application. Any material discrepancies between the foregoing specification and the specification of the aforementioned corresponding European application are to be resolved in favor of the latter.

There is claimed:

1. Method for bonding metallic structural elements to form a component, in particular for stationary gas turbines, which comprises locating at least one intermediate layer of nickel-chromium-boron with a thickness between 1 and 50 μm between the structural elements to be bonded, heating the intermediate layer together with the structural elements to a temperature of 1120° to 1230° C., exerting a pressure of 1 to 200 MPa before or after said heating on the structural elements together with the intermediate layer therebetween and maintaining the temperature and the pressure for a sufficient length of time to effect isothermal solidification of the intermediate layer and the alloying material of the structural elements in the joint zone with the formation of a strong bond between the structural elements.

2. Method according to claim 1, wherein the intermediate layer has a melting point between 1050° and 1230° C.

3. Method according to claim 1, wherein the intermediate layer has a melting point between 1220° and 1230° C.

4. Method according to claim 1, wherein said pressure exerted on the structural elements together with the intermediate layer therebetween is between 10 and 100 MPa.

5. Method according to claim 1, wherein the intermediate layer is a member selected from the group consisting of an amorphous brazing foil, a brazing layer, a brazing powder and a powder to reduce the melting point of the material forming the structural elements.

6. Method according to claim 5, wherein the intermediate layer is a nickel-chromium-boron foil.

7. Method according to claim 1, wherein the structural elements formed of a cobalt base or nickel base alloy of the γ-γ' type are used for manufacturing the component and wherein the bonding of the structural elements is carried out in a vacuum.

8. Method according to claim 7, wherein structural elements are formed of an alloy which contains 5 to 24% chromium, 0 to 11% molybdenum, 0 to 2% niobium, 0 to 7% tantalum and niobium, 0 to 22% cobalt, 0 to 6% titanium, 0 to 7% aluminum, 0.01 to 0.05% carbon, 0.01 to 0.2% beryllium, 0 to 3% zirconium, 0 to 2% hafnium, 0 to 6% iron and 0 to 12% tungsten, referred to the total weight of the alloy.

9. Method according to claim 1, wherein the pressure is applied to the structural elements by pressing tools.

10. Method according to claim 1, wherein the pressure is applied to the structural elements isostatically.

11. Method for bonding metallic structural elements to form a component, in particular for stationary gas turbines, which comprises locating at least one intermediate layer of nickel-chromium-boron with a thickness of between 1 and 50 microns between the structural elements and subsequently heating to effect brazing for a short period in the joint zone at least until the attainment of brazing seam sealing, subsequently cooling the structural elements and the intermediate layer and then subjecting the joint region to isostatic post-pressing at a temperature between 1120° and 1220° C.

12. Method according to claim 11, wherein the isostatic post-pressing temperature is between 1120° and 1220° C.

13. Method according to claim 11, wherein the isostatic post-pressing temperature is between 1180° and 1220° C.

14. Method according to claim 11, wherein the intermediate layer is a member selected from the group consisting of an amorphous brazing foil, a brazing layer, a brazing powder and a powder to reduce the melting point of the material forming the structural elements.

15. Method according to claim 14, wherein the intermediate layer is a nickel-chromium-boron foil.

16. Method according to claim 11, wherein the structural elements formed of a cobalt base of nickel base alloy of the $\gamma$-$\gamma'$ type used for manufacturing the component and wherein the bonding of the structural elements is carried out in a vacuum.

17. Method according to claim 16, wherein structural elements are formed of an alloy which contains 5 to 24% chromium, 0 to 11% molybdenum, 0 to 2% niobium, 0 to 7% tantalum and niobium, 0 to 22% cobalt, 0 to 6% titanium, 0 to 7% aluminum, 0.01 to 0.05% carbon, 0.01 to 0.2% beryllium, 0 to 3% zirconium, 0 to 2% hafnium, 0 to 6% iron and 0 to 12% tungsten, referred to the total weight of the alloy.

18. Method according to claim 11, wherein the pressure is applied to the structural elements by pressing tools.

19. Method according to claim 11, wherein the pressure is applied to the structural elements isostatically.

* * * * *